(12) United States Patent
Renaud

(10) Patent No.: US 11,853,010 B2
(45) Date of Patent: Dec. 26, 2023

(54) DEVICE FOR SECURING AND ADJUSTING A BEARING, ESPECIALLY FOR TIMEPIECES

(71) Applicant: François Besse, Nyon (CH)

(72) Inventor: Dominique Renaud, Morges (CH)

(73) Assignee: François Besse, Nyon (CH)

( * ) Notice: Subject to any disclaimer, the term of this patent is extended or adjusted under 35 U.S.C. 154(b) by 659 days.

(21) Appl. No.: 17/052,979

(22) PCT Filed: Mar. 19, 2019

(86) PCT No.: PCT/EP2019/056773
§ 371 (c)(1),
(2) Date: Nov. 4, 2020

(87) PCT Pub. No.: WO2019/179980
PCT Pub. Date: Sep. 26, 2019

(65) Prior Publication Data
US 2021/0216044 A1 Jul. 15, 2021

(30) Foreign Application Priority Data
Mar. 21, 2018 (CH) .................................. 00375/18

(51) Int. Cl.
*G04B 31/06* (2006.01)
*G04B 31/04* (2006.01)
(Continued)

(52) U.S. Cl.
CPC ............. *G04B 31/06* (2013.01); *G04B 31/04* (2013.01); *F16B 39/16* (2013.01); *F16C 35/02* (2013.01);
(Continued)

(58) Field of Classification Search
CPC ......... G04B 31/04; G04B 31/06; F16B 39/16; F16C 2226/60
See application file for complete search history.

(56) References Cited

U.S. PATENT DOCUMENTS 10,595,597 B2 * 3/2020 Catheline ............... G04B 31/00
2019/0101151 A1 * 4/2019 Michiwaki .............. F16B 33/02
(Continued)

FOREIGN PATENT DOCUMENTS

CH        99 986       7/1923
CH       342 523     11/1959

OTHER PUBLICATIONS

International Search Report for PCT/EP2019/056773 filed Aug. 29, 2019, 4 pages.

*Primary Examiner* — Edwin A. Leon
*Assistant Examiner* — Jason M Collins
(74) *Attorney, Agent, or Firm* — NIXON & VANDERHYE

(57) ABSTRACT

Disclosed is a device for securing and adjusting a bearing in an orifice in a bridge or a plate of a timepiece. It includes a first bearing screw defining a crimping opening of such a bearing and including an external thread, a second screw, so-called locking screw, defining an internal bore and including an external thread and a socket defining a tubular housing extending following a longitudinal axis, the tubular housing including a first tapped section, adapted to screw the first screw, and a second tapped section, adapted to screw the second screw. Advantageously, the external threads of the first and second screws and the corresponding sections of the socket have respective screwing pitches in opposite directions. Also disclosed is a method for securing and adjusting a bearing in an orifice provided for that purpose in a bridge or a plate of a timepiece thanks to such a device.

20 Claims, 1 Drawing Sheet

(51) Int. Cl.
*F16B 39/16* (2006.01)
*F16C 35/02* (2006.01)

(52) U.S. Cl.
CPC ...... *F16C 2226/60* (2013.01); *F16C 2370/00* (2013.01)

(56) References Cited

U.S. PATENT DOCUMENTS

2020/0132105 A1* 4/2020 Shinbutsu ............... F16B 39/16
2020/0355213 A1* 11/2020 Prevost ............... F16C 32/0614

* cited by examiner

DEVICE FOR SECURING AND ADJUSTING A BEARING, ESPECIALLY FOR TIMEPIECES

This application is the U.S. national phase of International Application No. PCT/EP2019/056773 filed Mar. 19, 2019 which designated the U.S. and claims priority to CH Patent Application No. 00375/18 filed Mar. 21, 2018, the entire contents of each of which are hereby incorporated by reference.

TECHNICAL FIELD

The present invention relates to the field of watchmaking. More particularly, it concerns a device for securing and adjusting a bearing in a bridge or a plate of a timepiece.

The invention also concerns a method for securing and adjusting a bearing in a bridge or a plate of a timepiece thanks to such an assembly.

STATE OF THE ART

In the field of watchmaking, the use of stones has been known for several centuries, substantially made of natural or synthetic ruby, to form bearings to support the ends or pivot-shanks of the axes of rotation of rotatable wheels such as the balance or the escapement wheel. These stones, also called bearings in certain cases, in particular in shock-absorbers, generally take a global disk shape, pierced or not, with two opposite faces, which can be flat or convex. We also know the use of simple bearings, for example made of metal instead of stones.

These stones or bearings are usually fixed in orifices arranged for this purpose on the plate or the bridges of a timepiece movement thanks to a metal ring, called «setting», which crimps the stone in its orifice. This setting is in practice driven in the housing orifice of the stone. Alternatively, the stones can be driven directly in an orifice formed in the bridge or the plate.

In certain configurations, in particular to reduce frictions of axes pivot-shanks, two stones are associated to form a support assembly consisting in a first pierced and convex stone receiving the pivot-shank in its orifice and in a second stone, so-called endstone, a flat face of which produces a counter-support of said pivot-shank. The endstone is then usually fixed in a metal plate secured to a bridge or the movement plate by screws and the first stone by a setting as previously described.

A major drawback or difficulty in the use of stones relates to their adjustment difficulty in the orifices provided for that purpose on the bridges or the plate of a watch movement. Indeed, it is worth performing with an extreme accuracy, manually, the piercing of said orifices and the successive driving of the stones and their setting in order to ensure the centring and the adjustment in height of the wheels that are supported in relation to the other wheels and parts of the movement. These operations thus require an enormous experience and dexterity of the adjusters who are in charge of the operation, which does not however exclude an error, even minimum of driving in-depth, in which case it is necessary to restart the operation and replace the setting, the stone, or both, which is extremely costly.

It is therefore needed to provide a solution for securing and adjusting the stones on the bridges and plates of watchmaking parts which allow a simplified implementation and adjustment of the stones, with controlled costs.

DISCLOSURE OF THE INVENTION

According to a first aspect, the invention also relates to a device for securing and adjusting a bearing, in particular for a stone, in an orifice provided for that purpose in a bridge or a plate of a timepiece. In the present invention, «bearing» means any type of part which support the transmission or rotation shafts of watch wheels in a watch movement, and in particular of the synthetic or natural stones usually used to form the bearings, or bearings-stones for example.

The device for securing and adjusting a bearing according to the invention is characterised in that it comprises:

- a first screw, so-called bearing screw, defining an internal support opening of such a bearing having a diameter $d_1$, said first screw comprising an external thread having an external diameter $df_1$ larger than $d_1$ and a length $L_1$, measured perpendicularly to said diameters $d_1$, $df_1$;
- a second screw, so-called locking screw, defining an internal opening having a diameter $d_2$ smaller or equal to $d_1$, said second screw comprising an external thread having an external diameter $df_2$ larger than diameters $d_2$, $d_1$, $df_1$ and a length $L_2$, measured perpendicularly to said diameters $d_2$, $df_2$; and
- a socket defining a tubular housing extending following a longitudinal axis A-A', said tubular housing comprising a first tapped section, adapted to screw the first screw, and a second tapped section, consecutive to the first section following the longitudinal axis A-A', adapted to screw the second screw, a medium area for the linear guiding of said screws being provided between the two tapped sections;
- the external threads of the first and second screws and the corresponding sections of the socket have respective screwing pitches in opposite directions.

The device of the present invention provides a solution for securing the bearings allowing to avoid an operator's particular know-how or dexterity to adjust the division and the clearances of wheels in relation to the bearings and their securing according to the classic modes of the prior art.

Indeed, it allows to set limits for the securing and adjustment operation by making the driving operation of the bearing independent of the quality of its adjustment thanks to the provision of the bearing screw, which may be adjusted longitudinally accurately in the orifice of the bridge or plate, which is provided with the socket and allows the step by step guiding during the screwing of the adjustment bearing screw. Therefore, nothing is left to chance in the position adjustment, which may be as precise as necessary by choosing the geometry of the bearing screw pitch.

The locking screw further provides an adjustment security as it allows to maintain the bearing screw in position once adjusted, and the respective screw pitches of the two bearing and locking screws being reversed, any form of friction coupling between the two screws is prevented, which guarantees the relative positions of said screws in the socket.

The locking screw may also be associated to an endstone inserted in a bore provided for that purpose in said locking screw, in order to provide an additional adjustment function to the device when a pierced bearing is driven in the appropriate opening of the bearing screw to receive a pivot-shank for a watchmaking wheel axis.

Another advantage of the invention aims at allowing a reduction of the number of bridges to simplify the assembly/disassembly operations of a movement and alignment and adjustment of the wheels.

According to a second aspect, the invention also concerns a method for securing and adjusting a bearing in an orifice provided for that purpose in a bridge or a plate of a timepiece thanks to a device according to one of the previous claims, characterised in that it comprises the following steps:

driving or machining of the socket in an orifice formed in said bridge or plate,
   driving of such a bearing flush in the internal support opening of the bearing screw,
   introduction of the bearing screw in the socket by screwing in a direction in a first section S1 of the socket,
   introduction of the locking screw by screwing in a second section S2 in an opposite direction to the screwing direction of the bearing screw and alignment with the bearing screw according to the A-A' axis of the socket up to the abutment of the locking screw against the bearing screw.

This method is therefore particularly simple, any particular skill of the operators implementing it not being necessary. Thus, potential driving and adjustment errors and the rejection of parts are limited.

BRIEF DESCRIPTION OF THE DRAWINGS

Other details of the invention will become clearer on reading the following description, with reference to the attached drawings in which.

EMBODIMENT OF THE INVENTION

Figure 1:
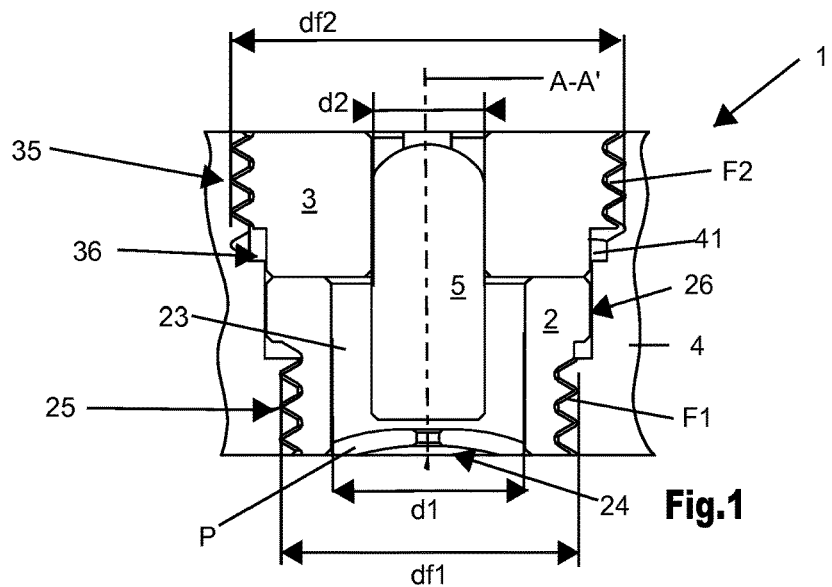
FIG. 1 shows a longitudinal cross-sectional view of a bearing securing device according to the invention, according to a first embodiment.
Figure 2:
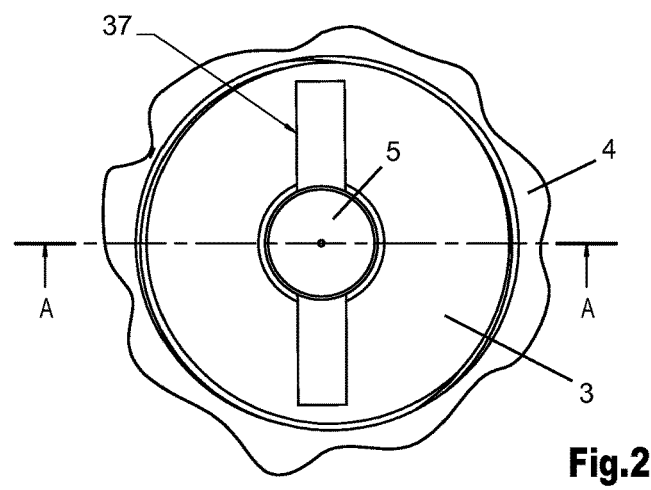
FIG. 2 is a top view of the device of FIG. 1.
Figure 3:
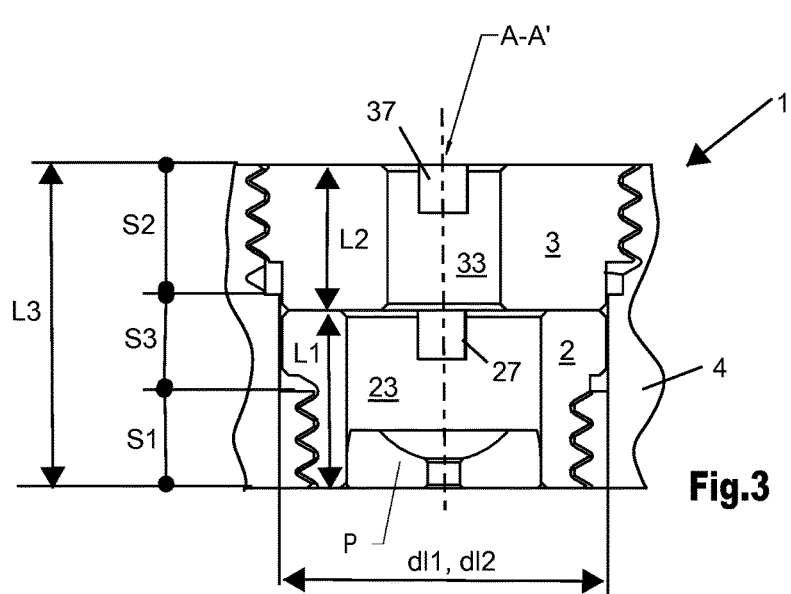
FIG. 3 shows a longitudinal cross-sectional view of a bearing securing device according to the invention, according to a second embodiment.

FIGS. 1 and 3 show two embodiment examples of a device 1 for securing and adjusting a bearing P in an orifice provided for that purpose in a bridge or a plate of a timepiece. These two examples substantially differ in the presence (FIG. 1) or absence (FIG. 3) of an endstone 5 for the adjustment of the division in relation to bearing P secured thanks to the device 1 of the invention according to the nature of said bearing P. More particularly, in the case of a flat stone P shown in FIG. 3, such an endstone 5 is not necessary, as in the mountings of classic flat stones known from the prior art.

The device 1 for securing and adjusting the bearing according to the present invention is designed and structured in order to keep to a minimum the dependence of the operations for securing and adjusting bearings P, in particular of stones, in the bridges/plate of watches wheels from the human experience and dexterity factors of the operators carrying out these operations. Further, it is designed to allow a simplified and recoverable adjustment, i.e. rectifiable in time, for example during movements overhaul operations.

For this purpose, device 1 comprises substantially a first screw 2, so-called bearing screw, and a second screw 3, so-called locking screw, configured to be adjusted in position and cooperate for securing and adjusting such a bearing P in a socket 4, forming a nut, adapted to be driven or formed in the mass in an orifice provided for that purpose in a bridge or a plate.

The bearing screw 2 is composed of a annular ring pierced longitudinally by a central through bore 23 of diameter d1 defining at an end an internal crimping opening 24 for a bearing P. The bearing screw 2 further comprises at its periphery two consecutive sections 25, 26, in this particular case a first threaded section 25 and a non-threaded head section 26, each of said sections presenting a different external diameter df1, dl1 and such that $d1<df1<dl1$.

The threaded section 25 comprises an external thread F1 having an external diameter df1 extending on at least half of the length L1 of the bearing screw 2, measured perpendicularly to said diameters d1, df1, dl1. The thread F1 may have a variable shape, in particular of the ISO metric type, trapezoidal or sawtooth type, and defines a first screwing direction, for example anticlockwise (to the left).

The head section 26 does not have a thread and forms a cylindrical ring having a diameter dl1 with a flat external surface, connected to the threaded section 25. This head section 26 and its flat peripheral surface have a guiding and centring function of the bearing screw 2 in the socket 4 as described below. Finally, the head section 26 has a flat end surface, which contains advantageously preferably one or several notches 27 or grooves (FIG. 3) adapted to insert a screwing tool such as a screwdriver.

The locking screw 3 is composed of a annular ring pierced longitudinally by a central through bore 33 of diameter d2 and further comprises at its periphery two consecutive sections 35, 36, in this particular case a first non-threaded section 36 and a threaded head section 35, each of said sections presenting a different external diameter dl2, df2 and such that $d2<dl2<df2$. Thus, the locking screw 3 has a structure similar to that of the bearing screw 2 but reversed.

The central bore 33 is designed to receive, as shown in FIG. 1, an endstone pin 5 which may be driven according to the longitudinal axis A-A' of socket 4 in said bore 33 after its screwing in socket 4.

The threaded section 35 comprises an external thread F2 having an external diameter df2 extending on at least half, preferably on substantially ⅔ of the length L2 of the locking screw 3, measured perpendicularly to said diameters d2, df2, d12. The length L2 may be smaller or equal to the length L1 of the bearing screw, preferably.

The thread F2 may also have a variable shape, in particular of the ISO metric type, trapezoidal or sawtooth type, and defines a second screwing direction contrary to that of bearing screw 2, for example clockwise (to the right). The threaded section 35 has a flat upper surface (on the figures) which contains advantageously preferably one or several notches 37 or grooves adapted to insert a screwing tool such as a screwdriver.

The base section 36 does not have a thread and forms a cylindrical ring having a diameter d12 with a flat external surface, connected to the threaded section 35 by a shoulder 36. This base section 36 and its flat peripheral surface have a guiding and centring function of the bearing screw 3 in the socket 4 in relation to bearing screw 2 as described below. For this purpose, the diameter d12 of the base section 36 is equal to diameter dl1 of the head section 26 of the bearing screw 2 and has, as the latter, a flat end surface provided to come into abutment against the flat end surface of the head section 26 of the bearing screw 2.

The different useful diameters of the two screws 2, 3 of the device 1 according to the invention are thus preferentially such that:

$$d2<d1<df1<dl1 \leq dl2<df2.$$

The socket 4 defines a tubular housing 41 extending according to a longitudinal axis A-A', in which the two screws 2, 3 can be screwed and adjusted by screwing in a longitudinal position in the housing in order to ensure the centring of a bearing and, if need be, its positioning in relation to the surface of a bridge or a plate of a watch movement.

This socket 4 may optionally be formed of a annular ring forming a nut with screws 2, 3, whose shape and dimensions are adapted for its insertion by driving in an orifice pierced in such a bridge or plate, or machined directly in the mass of such a bridge or plate, by boring and tapping of an pierced through orifice according to said A-A' axis. The first solution advantageously provides a unitary device 1, simple to package by its manufacturer and to use by a watch movement fitter, the socket 4 forming a body in which the screws 2, 3 can be pre-screwed, and a simple piercing at scale being required in the bridges and plates to drive the socket 4. The second solution offers the advantage of avoiding a driving operation of the socket 4 for the fitter, as well as a better visual rendering on the movement.

Whatever the embodiment of the socket 4, the tubular housing 41 defined by it has a length L3 larger or equal to the sum of lengths L1, L2 of screws 2, 3. Said housing 41 advantageously comprises three consecutive sections configured to follow the particular sections of the bearing screw 2 and of the locking screw 3. The tubular housing 41 thus comprises a first tapped section S1, adapted to screw the threaded part 25 of the bearing screw 2, and a second tapped section S2 adapted to screw the threaded section 35 of the locking screw 3, these two sections S1,S2 being joined by a non-tapped medium section S3 adapted to guide linearly the non-threaded sections 26, 36 of the bearing screw 2 and of the locking screw 3 such that said screws 2, 3 are aligned coaxially with axis A-A' during their screwing in the socket 4. Of course, the tappings of sections S1, S2 of the socket 4 are complementary of threads F1, F2 of screws 2, 3 in order to ensure their screwing and unscrewing without play in the socket 4.

The device 1 for securing and adjusting a bearing P described according to the invention allows to perform the assembly and the adjustment of such a bearing P in an orifice provided for that purpose in a timepiece bridge or a plate according to a simple method, easily reproducible in a mastered manner without implementing a particular skill by any average watchmaking fitter, constituting the man of the art within the framework of the invention. This securing and adjustment method comprises the following steps.

A first step consists in installing the socket 4 of the device 1 in such a bridge or plate orifice. To this end, according to the embodiment of the socket 4 preferred by the fitter, said socket 4 is driven in the orifice provided for that purpose or, alternatively, the various sections S1, S2, S3 are machined in said orifice.

In a second step, such a bearing P is then driven to be flush, i.e. it is flush at the end of the threaded section 25 of the bearing screw 2, in the internal crimping opening 24 of the bearing screw 2 of the device 1. Said bearing P may be of any classic type, in particular of a pierced and convex stone type as in FIG. 1 or a flat stone as in FIG. 3. The bearing screw 2 therefore has a function of a setting known in the prior art.

Once the bearing P is inserted in the opening 24 of the bearing screw 2, the latter is inserted in the socket 4 by screwing in the anticlockwise direction (according to the convention previously defined in reference to FIGS. 1 and 3) in the section S1 of the socket 4. During this screwing of the bearing screw 2, the passage of the head section 26 of the screw in section S3 of the socket 4 allows a centring of screw 2 and of bearing P according to the A-A' axis of socket 4.

Preferably, screw 2 is screwed up to a desired adjustment position of the clearance and/or division of a watch wheel to pivot on bearing P. Then, said wheel is placed in the orifice provided for that purpose and the adjustment of the clearance is made at the level of its axis by adjustment of the screwing depth of the bearing screw 2 in the socket. Once this adjustment is done, the locking screw 3 is finally positioned by screwing in section S2 in a opposite direction to that of screwing of bearing screw 2, i.e. a clockwise direction in the case described. The screwing of the locking screw 3 in the socket 4 also provides, if need be, a centring of this screw 3 and its alignment with the bearing screw 2 according to the A-A' axis of the socket 4 following the insertion of the base section 36 of the locking screw 3 in section S3 of the socket 4 while it penetrates the socket 4 until coming into abutment against the bearing screw 2. This screwing in abutment of the locking screw 3 ensures the longitudinal blocking in the socket of the bearing screw 2 and of the locking screw 3, which cannot go up or go down, even in case of vibrations, due to the opposite directions of the respective pitches of both screws 2, 3.

The method of the invention allows to secure a bearing P and to adjust its position as well as to adjust watch wheels pivoted on such a bearing in a substantially «mechanical» way, thanks to the structure of the device 1 of the invention, inducing an automatic centring of the screws 2, 3 in their socket 4 as well as a longitudinal adjustment of said screws to ensure the perfect adjustment of the clearance by simple screwing of the bearing screw 2 then locking the latter with the locking screw 3. Furthermore, it is worth noting that this device also facilitates maintenance and overhaul, the openings 23, 33 of the screws facilitating the lubrication of the bearing P, as well as its disassembly if necessary, or even its replacement by simple unscrewing of the bearing screw 2 of the socket 4.

The method of the invention as described above applies in particular without any other step for the assembly of a flat stone, as shown in FIG. 3. The implementation of an endstone 5 may also be considered in order to limit the longitudinal penetration according to the A-A' axis of the socket 4 of a pivot-shank of a watch wheel axis designed to be mounted to pivot in a bearing P of a convex stone type as in FIG. 1. In this case, the securing method comprises an additional driving step for the endstone 5 in the bore 33 of the locking screw 3 coaxially to the A-A' axis of the socket in order to adjust the division distance between the lower end of the endstone 5 and a surface of said bearing P driven in the bearing screw 2. In such a configuration, the endstone 5 is preferably selected so that its length L4 is such that L2<L4<L3.

The invention offers a simple and economical attachment and adjustment solution for a bearing in a timepiece bridge or plate.

The invention claimed is:
1. Device (1) for securing and adjusting a bearing (P) in an orifice provided for that purpose in a bridge or a plate of a timepiece, comprising:
  a. A first screw (2), so-called bearing screw, defining an support opening (24) of such a bearing (P) having a diameter d1, said first screw (2) comprising an external thread (F1) having an external diameter df1 larger than d1 and a length L1, measured perpendicularly to said diameters d1, df1;
  b. A second screw (3), so-called locking screw, defining an internal bore (33) of diameter d2 smaller or equal to d1, said second screw (3) comprising an external thread F2 having an external diameter df2 larger than diam- eters d2, d1, df1 and a length L2, measured perpendicularly to said diameters d2, df2; and c. A socket (4) defining a tubular housing (41) extending following a longitudinal axis (A-A'), said tubular housing (41) comprising a first tapped section (S1), adapted to screw the first screw (2), and a second tapped section (S2), adapted to screw the second screw (3), said tapped sections being joined by a medium section (S3) of linear guiding of said screws (2, 3);

d. The external threads (F1, F2) of the first and second screws (2, 3) and the corresponding sections (S1, S2) of the socket (4) have respective screwing pitches in opposite directions.

2. The device according to claim 1, wherein each screw (2, 3) comprises a cylindrical section (26, 36) devoid of thread and having an external diameter dl1, dl2 such that df1<dl1≤dl2<df2 and wherein the socket (4) comprises a non-tapped medium section (S3) having an internal diameter equal to said diameters dl1, dl2, said cylindrical sections of the screws and medium section S3 of the socket being such that said screws are aligned coaxially with the A-A' axis during their screwing in the socket (4) by guiding their non-threaded cylindrical section in the medium section S3 of the socket (4).

3. The device according to claim 2, wherein the internal crimping opening (24) of such a bearing (P) of the bearing screw (2) comprises a through bore opening at the longitudinal ends of said bearing screw (2).

4. The device according to claim 2, wherein the locking screw (3) comprises an internal through bore (33) opening at the longitudinal ends of said locking screw (3), said internal bore (33) having an internal diameter d2 smaller than d1.

5. The device according to claim 2, wherein said socket (4) is able to be driven in an orifice shaped for that purpose in a bridge or a plate.

6. The device according to claim 2, wherein said socket (4) is machined in a bridge or a plate.

7. The device according to claim 1, wherein the internal crimping opening (24) of such a bearing (P) of the bearing screw (2) comprises a through bore opening at the longitudinal ends of said bearing screw (2).

8. The device according to claim 7, wherein the locking screw (3) comprises an internal through bore (33) opening at the longitudinal ends of said locking screw (3), said internal bore (33) having an internal diameter d2 smaller than d1.

9. The device according to claim 7, wherein said socket (4) is able to be driven in an orifice shaped for that purpose in a bridge or a plate.

10. The device according to claim 7, wherein said socket (4) is machined in a bridge or a plate.

11. The device according to claim 1, wherein the locking screw (3) comprises an internal through bore (33) opening at the longitudinal ends of said locking screw (3), said internal bore (33) having an internal diameter d2 smaller than d1.

12. The device according to claim 11, further comprising an endstone (5) adapted to be driven according to the longitudinal A-A' axis of the socket (4) in said internal bore of the locking screw (3) after screwing of the latter in the socket, said endstone (5) having a length L4 such that L2<L4<L3.

13. The device according to claim 12, wherein said socket (4) is able to be driven in an orifice shaped for that purpose in a bridge or a plate.

14. The device according to claim 11, wherein said socket (4) is able to be driven in an orifice shaped for that purpose in a bridge or a plate.

15. The device according to claim 1, wherein said socket (4) is able to be driven in an orifice shaped for that purpose in a bridge or a plate.

16. The device according to claim 1, wherein said socket (4) is machined in a bridge or a plate.

17. The device according to claim 1, wherein said bearing screw (2) and locking screw (3) comprise at the level of at least one of their longitudinal ends coupling means (27, 37) to a screwing tool.

18. The device according to claim 17, wherein the coupling means (27, 37) to a screwing tool comprises one or more notches.

19. Method for securing and adjusting a bearing (P) in an orifice provided for that purpose in a bridge or a plate of a timepiece thanks to a device (1) according to claim 1, further comprising the following steps:

e. Driving or machining of the socket (4) in an orifice formed in said bridge or plate, f. Driving of such a bearing (P) flush in the internal support opening (24) of the bearing screw (2), g. Introduction of the bearing screw (2) in the socket (4) by screwing in a direction in the section (S1) of the socket (4), h. Introduction of the locking screw (3) by screwing in the section (S2) in an opposite direction to the screwing direction of the bearing screw (2) and alignment with the bearing screw (2) according to the A-A' axis of the socket up to the abutment of the locking screw (3) against the bearing screw (2).

20. The method according to claim 19, further comprising the following additional steps:

j. Driving of an endstone (5) in a central bore (33) of the locking screw (3) coaxially with the A-A' axis of the socket (4), and k. Adjustment of the division between an end of the endstone (5) and a surface of the bearing (P) driven in the bearing screw (2) by adjusting the drive distance of the endstone (5) with the bearing.

* * * * *